United States Patent Office 2,742,245
Patented Apr. 17, 1956

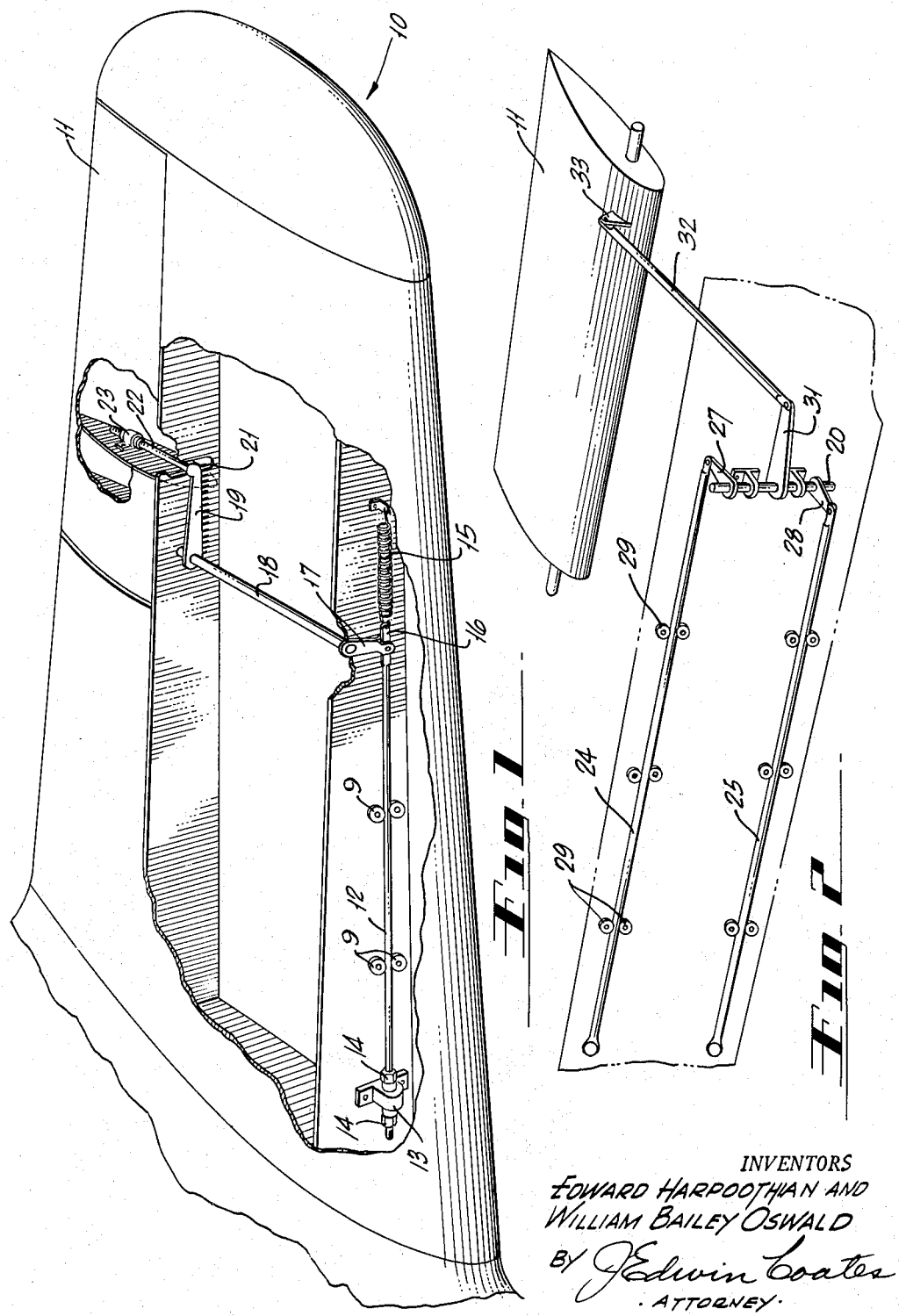

2,742,245

GUST LOAD ALLEVIATING DEVICE

Edward Harpoothian and William Bailey Oswald, Los Angeles, Calif., assignors to Douglas Aircraft Company, Inc., Santa Monica, Calif.

Original application February 28, 1949, Serial No. 78,866. Divided and this application December 1, 1951, Serial No. 259,401

12 Claims. (Cl. 244—76)

This invention relates to aircraft having airfoils subjected to gust loading, and aims to automatically relieve these gust-deflected airfoils of such extra loading in order to produce smoother flight and to prolong the life of the airfoil and enhance the safety of the airplane.

This application is a division of our co-pending application, Serial No. 78,866, "Gust Load Alleviating Device," filed February 28, 1949, now abandoned.

The wings and other airfoils of modern airplanes are repeatedly subjected to upward and downward deflections under the action of gusts or thermal currents when the airplane passes through certain localities. Such flexures of the airfoil not only render the flight uncomfortable but stress the airfoil framing inordinately, thereby decreasing the margin of safety of the airfoil and weakening its fibre structure through fatigue.

Although it has been proposed hitherto to relieve gust-loaded airfoils of this extra loading by employment of torsionally flexible wings, wings rotatable at their roots, electronic gust anticipators and other devices of this general nature, all these prior proposals are subject to frequent failure for various reasons. Moreover, even the mechanical or linkage type gust load alleviators hitherto proposed have been found unsatisfactory because of their being constructed with heavy, multiple lever deflection transmitting and multiplying systems which are quite prone to structural failure; or because they include hydraulic struts or incorporate power multiplying systems, all of which previous devices impose a prohibitive weight penalty. For these and other reasons actual use of these ideas is precluded. In each case, they also involve in their operation a time lag factor of such duration that the "bump" has been passed before the device can function; or they require such a long time to operate that the airfoil's structural fibres will be excessively strained and remain in a greatly deflected condition too long before the device restores the airfoil to its original condition. In hydraulically operated devices, the foregoing situation is aggravated by the fact that the lag of such systems is augmented by the lag of the internal parts and fluid system of the hydromotor, as well as that of the mechanical linkage and other parts comprising the system.

The present invention reduces the gust loading of such airfoils by varying the camber of the airfoil, and therefore its lift-originated strain, substantially instantaneously and proportionately to the gust loading, but in the opposite direction to the strain induced by the gust and the deflections. Essentially this end is achieved by gust-responsive means carried by the airfoil and bi-directionally responsive to gust loadings, these means being connected directly and linearly to a surface deflectable for varying the camber of the airfoil in the sense necessary to alleviate the gust induced strain on the airfoil. More particularly, the gust-load responsive device may comprise a member displaceably or deformably mounted to a structural member of the airfoil and movable relatively to the direction of the deflection of the airfoil by virtue both of the flexural displacement and of the fibre stress of the structural member carrying it under gust actions. This movable member is in turn connected to a camber varying surface, such as a flap or an aileron, carried at the trailing edge of the airfoil, the connection and the force transmission and transformation being effected, in one adequate illustrative manner by a system of articulated, rigid links and levers operationally interposed between the movable member and the camber varying surface, the components of the system being so organized together and with the means terminating each end of the system as to substantially, instantaneously transmit the movements of the movable member to the camber varying surface to effect substantially instantaneous return of the airfoil to its original position and normally stressed condition.

In all constructional embodiments of these and other inventive concepts, the mass-weight of the alleviator-mechanism, of the lift-varying means, and of the wing are so correlated that the natural frequency of the alleviator system is higher than that of the wing. This feature permits the alleviator to operate before the gust produced wing flexure has reached its maximum. This correlation not only reduces the lag of the means for transmitting the movements of the gust-responsive member substantially to zero but contributes towards rendering the action of the device directly proportional to the gust-flexure of the wing, while assuring that it will complete its action well in advance of the maximum deflection of the wing.

With these concepts and means embodied in one form of the invention, wind tunnel tests have indicated that with a gust gradient distance of 1.9 chord lengths and a gust velocity of 23 ft./sec., the device is capable of reducing the wing tip deflection by at least 26% and the wing loading by 22%.

Solely for the purpose of rendering the inventive concepts more graphic, and in order to further clarify the generic nature of the invention, several of the aforementioned species are illustrated in the accompanying drawings and will be described hereinafter in conjunction therewith.

In these drawings:

Figure 1 is a perspective view of a wing provided with one form of an alleviator device including a movable gust responsive member operating an auxiliary surface; and Figure 2 is a diagrammatic perspective view of a modified gust responsive member and linkage mechanism.

The alleviator illustrated in Figure 1 employs, in order to vary the camber of the wing, an auxiliary surface 11 carried at the trailing edge of the wing 10, this surface being configured with a gust-responsive device designed to alleviate the gust loading on the wing. Utilized as the gust sensing member is an elongate, inextensible somewhat flexible member 12 which is nonetheless rigid enough to withstand repeated flexures. It is preferably arranged in longitudinal parallelism with the front face of the foremost wing spar and lies adjacent the lower margin thereof, with its inboard end passing through a bracket 13 projecting from the spar, nuts 14 being provided on the member 12 inboard and outboard of the bracket to anchor the flexible member. Inboard movement of the latter member is also restrained, and the system stabilized and flexiblized, by means of a helical spring 15 suitably anchored at its outboard end to the spar face, its inboard end being connected to the outboard end of the flexible member by means of a link 16 pivoted to both the aforementioned members at its respective ends. Pivotally connected to the junction of the members aforedescribed is the lower end of an arm 17 rigidly fixed to the forward end of a shaft 18 which extends horizontally and chordwise rearwardly through the main spars of the wing. Near the rear end of shaft 18 is mounted a horizontally outboardly extending arm 19, terminated by the ball or socket of a ball and socket joint 21, the complementary member of which joint is carried on the forward end of an arm 22 pinned for movement about a horizontal axis to a bracket 23 mounted in the interior framing of the airfoil 11.

When the wing is flexed upwardly, as by an up-gust, the lower margin of the spar is elongated relatively to the member 12. The latter, being rigid, remains of fixed length, whereas the closely adjacent lower edge of the spar, being more flexible, elongates somewhat. Compared to the action of the lower edge of the spar, the rigid rod 12 thus, in effect, undergoes a relative shortening. The relative motion occurring to the right, the rod 12 thus in effect "shortens" to the leftward. Hence, the relative movements of the member 12 and the spar's lower edge effectuate a leftward pull on the lower end of arm 17, rotating shaft 18 clockwise, consequently depressing the arm 19 and tilting the rod 22 downwardly at its forward end. Thereby the airfoil 11 is elevated, decreasing the effective camber of the wing and lessening its lift sufficiently to restore it substantially to its original position and condition. On reversal of the direction of the gust, the alleviator system operates in the reverse sense. The lower margin of the spar decreases in length relatively to member 12, which latter is thus relatively elongated outwardly and urges the lower end of arm 17 to the right. The counter-clockwise rotation of shaft 18 depresses the airfoil 11, thereby to augment the lift of the downwardly flexed wing and to restore it substantially to its original position and condition. The spring 15 restores the arm 17, and consequently the airfoil 11, to neutral position after movement thereof in either direction of operation. In both cases, the wing is relieved of its gust-loading to at least the extent of 44% of the total additional loading and flight bumps or roughnesses are greatly reduced by smoothing out the vertical flight path of the aircraft substantially to level or horizontal, lengthening the life of the wing fibres and preventing crystallization thereof under fatigue, thereby enhancing the safety of the craft and rendering its piloting easier.

A further development of the basal concepts is illustrated in Figure 2. In this constructional species, the wing flexure and fibre stresses are summated and transformed into wing camber and lift variations by means including a gust load responsive torque tube 20, and pretensed gust load actuated components 24 and 25. The torque tube 20 is mounted in the front spar in vertically disposed attitude in a cutout, not shown, extending vertically of the spar and is capable of rotation about its vertical axis. It bears two arms 27 and 28 fixed near opposite ends thereof and projecting in opposite directions therefrom, the arm 27 extending rearwardly from the rear face of the spar and the arm 28 extending forwardly from the front face of the spar. The pre-tensed summating member 24 lies in parallel adjacency to the rear face of the spar, being anchored thereto at its inboard end and constrained to follow exactly the flexures of the spar by anti-friction rollers 29, and is pivotally connected at its outer end to arm 27. The pre-tensed summating member 25 lies in parallel adjacency to the front face of the spar, being anchored thereto at its inboard end and similarly constrained by anti-friction rollers 29, the outer end of member 25 being pivotally connected to arm 28.

The medial portion of the torque tube fixedly bears an arm 31 extending outboard therefrom through a cutout, not shown, in the spar. The outboard end of this arm is pivotally connected to link 32 extending rearwardly to a horn 33 on the auxiliary airfoil 11.

The action and effects of the construction of this species of the invention are substantially the same as those described in conjunction with the form shown in Figure 1. When the spar deflects upwardly under the effects of an upgust, the lower flange thereof elongates, effecting relative shortening of the member 25 which, through arm 28, exerts a rotative pull on tube 20. Concurrently, the upper flange of the spar shortens, effecting relative elongation of member 24 which consequently exerts a rotative push on the arm 27. The summation of these two actions results in a clockwise rotation of torque tube 20, viewed from above. The torque tube 20 hence rotates clockwise in plan view to elevate the auxiliary airfoil when the wing is flexed upwardly by an up-gust, and rotates counterclockwise to depress the airfoil when the wing is deflected downwardly by a down-gust.

Since the mass weight, structural form, and initial tension of the alleviator, the auxiliary surface, and the wing are so correlated that the natural vibration frequency of the alleviator is higher than that of the wing, and inasmuch as the pre-tensed rods can be elongated as desired to confer the requisite response-sensitivity on the alleviator system, the device has no appreciable lag and operates almost instantaneously. Hence, the wing is restored substantially to its original position almost as soon as the deflection takes effect thereon, thereby smoothing the vertical flight path of the airplane and reducing the fatigue factor of the airfoil, preventing crystallization of the framing members which would occur otherwise under the repeated flexure, vibration and distortion of the wing.

When it is undesirable to allow the alleviator to operate to effect lift reduction, as in a turn or other maneuver, standard lockout means for locking out the movement of a linkage system of this kind, which means are not shown, but are well known and easily combinable with the present structure, may be provided and will operate to render it inoperative and relieve the auxiliary airfoil of the actuating forces otherwise emanating from the alleviator. Since these means form no part of the present invention and are purely optional and not mandatory, no further description or showing are deemed necessary to the man skilled in the art.

We claim:

1. An aircraft airload reducing device, comprising: a central section; a wing carried thereby and extending laterally therefrom; bracing structure extending spanwise within said wing and secured thereto, said wing and bracing structure being sufficiently flexible to be deflected bi-directionally in response to gust loads thereon resulting in respective spanwise extension and contraction of the upper and lower portions thereof; a torque member rotatably mounted in vertical attitude on a member of said bracing structure; arms fixed to the upper and lower portions of said torque member and extending therefrom in opposite chordwise directions; an elongate member disposed in spanwise relation to the one face of said bracing structure member and anchored thereto at the inboard end of the elongate member, the outboard end of said elongate member being pivotally connected to the upper arm on said torque member; another elongate member disposed in spanwise relation to the opposite face of said bracing structure member and anchored thereto at the inboard end of said elongate member, the outboard end of said elongate member being pivotally connected to the lower arm on said torque member; a spanwise extending arm fixed to said torque member; movable means carried by said wing for varying the lift thereof, and a single, direct-acting positively connecting member disposed in chordwise attitude in said wing and pivotally connected at its forward end to said spanwise extending arm and pivotally connected at its rear end to the lift-varying means whereby to move the lift-varying means in response to and in proportion to the relative movement of the outboard ends of said elongate, spanwise extending members and in a direction to produce an aerodynamic opposition to the deflection of said wing.

2. An air load reducing device for airplanes, comprising: a central section; a wing carried thereby and extending laterally therefrom; bracing structure extending spanwise within said wing and secured thereto, said wing and bracing structure being sufficiently flexible to be deflected bi-directionally in response to gust loads thereon resulting in respective spanwise extension and contraction of the upper and lower portions thereof; a lift-varying airfoil deflectably mounted on said wing; torque-responsive means carried in upright attitude by said bracing structure and in parallelism thereto and mounted therein in an axially rotatable condition; chordwise extending arms projecting in opposite directions from the upper and the lower portions of said torque responsive means; elongate inextensible members carried by said structure in lengthwise adjacency thereto and anchored thereto at their inboard ends, the outboard end of each of said members being pivotally connected to the adjacent one of said arms to impart rotation to said torque responsive means when said elongate members move relative to said bracing structure; another arm fixedly carried by said torque responsive means; and chordwise extending linkage means connected at its forward end to said other arm and connected at its rearward end to said lift-varying airfoil whereby to transform the opposite rotations of said torque responsive member under flexures of said wing into wing load relieving deflections of said lift-varying airfoil.

3. An air load reducing device for airplanes, comprising: a central section; a wing carried by and extending laterally therefrom; bracing structure extending spanwise within said wing and secured thereto, said wing and bracing structure being sufficiently flexible to be deflected bi-directionally in response to gust loads thereon resulting in respective spanwise extension and contraction of the upper and lower portions thereof; a lift-varying airfoil deflectibly mounted on the trailing edge of said wing; a rigid, elongate torque member rotatably mounted in vertical attitude on said spar for rotation about its vertical axis in opposite directions; rigid arms fixed to the upper and to the lower portions of said torque member with the upper arm projecting rearwardly and the lower arm projecting forwardly therefrom; a pair of pre-tensed, elongate, spanwise extending wing deflection-sensing members disposed in lengthwise relationship to said bracing structure and anchored thereto at the inboard ends of said deflection-sensing members; the deflection-sensing members having their outboard ends pivotally connected to said arms; another arm fixed to said torque member intermediate the ends of said member and extending laterally outwardly therefrom; and a push-pull linkage rod extending chordwise from said laterally extending arm to said auxiliary airfoil and pivotally connected at each end of the rod to the adjacent one of the aforementioned instrumentalities and effective to transform the movements of said deflection-sensing members into wing load relieving deflections of said lift-varying airfoil.

4. An airload reducing device for airplanes, comprising: a substantially central body portion; a wing carried thereby and extending laterally therefrom; bracing structure extending spanwise within said wing and secured thereto; both elements being sufficiently flexible to be deflected in planes out of the wing's own plane, in response to gust loads thereon and resulting in respective expansions and contractions of both said elements; lift-varying means mounted to said wing; a torque member mounted in substantially vertical attitude with respect to said wing for rotation about its vertical axis, said torque member bearing a motion-receiving and multiplying member projecting angularly therefrom; at least one elongate, relatively inextensible, wing and bracing deflection-sensing member disposed in lengthwise relationship to said bracing structure and having its one end anchored to said bracing structure and having its opposite end free from direct attachment to aircraft structure, said opposite end being pivotally connected to said torque member so as to effect said rotation thereof; and motion-transmitting means, pivotally connecting said motion-receiving and multiplying member directly to said lift-varying means, said motion-transmitting means being actuated solely by the force generated in said deflection-sensing member and being effective to deflect the lift-varying means in proportional response to said deflections of said wing and said bracing-structure and in directions and magnitudes sufficient to relieve said wing of gust load deflections.

5. An aircraft airload reducing device, comprising: a major disposable-load carrying aircraft member; a gust deflectible wing carried thereby and extending laterally therefrom; gust-flexible wing bracing structure extending spanwise within the wing and forming a unit therewith; a pair of wing-deflections sensing means disposed spanwise of said unit, the one end of said sensing means being anchored to said unit and the opposite end of said means being free; wing-lift varying means; a torque member rotatably mounted in the vertical attitude to a spanwise-extending component of said bracing structure adjacent said free end of said sensing means; a motion receiving member mounted to the one end-portion of said torque member and extending in the one direction and connected to the free end of the one sensing means; a similar member mounted to the opposite end-portion of said torque member and extending in the direction opposite to the aforesaid direction and connected to the free end of the other sensing means; an arm having the one end fixedly mounted to said torque member, said arm having an opposite end; and a substantially rectilinear rigid link-unit extending rectilinearly and directly between said opposite end of said arm and said lift-varying means and pivotally connected to the last said end and said lift-varying means.

6. An aircraft airload reducing device, comprising: a main body-portion; a gust deflectible wing carried thereby and extending laterally therefrom; gust-flexural wing bracing structure extending spanwise of the wing and forming a unit therewith; a first wing-deflections sensing elongate member disposed spanwise of the wing and lying on the one face of said bracing structure with one end of the member anchored to said unit, the opposite end of said member being free; wing lift varying means; an oscillatable member mounted in substantially vertical attitude on a spanwise extending member of said bracing structure; a pair of arms extending oppositely from the upper portion and from the lower portion, respectively, of said oscillatable member; a pivotal connection between the free outboard end of said first sensing member and the end of the adjacent one of said arms; a second wing-deflections sensing elongate member disposed spanwise of the wing and lying on the opposite face of said bracing structure from the first-said face with one end of the member anchored to said unit, the opposite end of said member being free; a pivotal connection between the free outboard end of said second sensing member and the end of the arm adjacent thereto; means carried by said oscillatable member for extending the oscillatory motion of said oscillatory member laterally thereof and magnifying said motion; and a single motion-transmitting member extending in a right-line from the last said means to said lift varying means, said single member being pivotally connected to said motion-magnifying means and to said lift-varying means; whereby to minimize time-lag in transmission of the gust load alleviating relative movements of said sensing members to said lift varying means.

7. An aircraft airload reducing device, comprising: a major disposable load carrying aircraft member; a gust deflectible wing carried thereby and extending laterally therefrom; a gust-flexible wing bracing structure extending spanwise within the wing and forming a unit therewith; at least one wing-deflections sensing means being disposed spanwise of said unit, the one end of said sensing means being anchored to said unit and the opposite end being free for spanwise movement with respect thereto in response to spanwise expansions and contractions of portions of said unit; wing lift varying means carried by said wing; a torque member rotatably mounted within said wing; a first arm extending laterally from said torque member with its swingable free end drivenly connected to the spanwise movable free end of said sensing means for producing powered rotative movement of said torque member; a second arm extending laterally from said torque member and swingable in a plane spaced from and substantially parallel to the plane in which said first arm swings, said second arm being swung by the powered rotation of said torque member; and link means extending directly between said wing lift varying means and the end of said second arm and forming the sole connection to transmit the powered movement of said second arm to said wing lift varying means to actuate the latter; the spanwise relative movement of said sensing means constituting the sole source of the power and movement transmitted to said wing lift varying means.

8. An aircraft airload reducing device according to claim 7, in which said wing-deflection sensing means consists of a single elongate, substantially flexible and inextensible member and in which said torque member extends chordwise in the wing with its forward end lying adjacent the outboard end of said elongate member, the forward and rearward end-portions of said chordwise extending member each having an arm projecting laterally therefrom, the free end of the arm that projects from the forward end of said chordwise torque member being pivotally connected to the outboard end of said elongate member; and said link means that extends directly between said lift-varying means and the end of the arm that projects from the rear end of said torque member and forms the sole connection transmitting movements of the last said arm to said varying-means consisting of a chordwise extending rod having its forward end pivoted to the last-said arm and having its rearward end adjustably connected to said lift-varying means.

9. An aircraft airload reducing device according to claim 7, in which said wing-deflections sensing means consists of a single elongate, relatively inextensible member and in which said torque member extends chordwise with its forward end lying adjacent to the outboard end of said elongate member, said torque member having an angular extension disposed near the one end thereof adjacent said outboard end of said sensing member, said extension being pivotally connected to said outboard end; and reactive means disposed on the prolongation-line of the outboard end of said sensing means, said reactive means having its inner end portion pivotally connected to said outboard end of the sensing member and having its outer end fixed to the wing so as to enable the reactive means to return said torque member and lift-varying means to their initial positions upon removal of the gust load.

10. An aircraft airload reducing device according to claim 7, in which said wing-deflections sensing means consists of a single, elongate, relatively inextensible member and in which said torque member consists of a force-transmitting shaft extending chordwise in said wing toward said lift-varying means; the means for producing powered rotative movement of said chordwise-extending torque member consisting of a motion-converting means pivotally connected to the outboard end of said elongate member and fixedly carried on the adjacent end of said chordwise extending torque member and adapted to convert the relative spanwise movements of said elongate member into rotary movements of said chordwise extending shaft about the chordwise axis of said shaft; and force-transmitting and converting means connecting the rear end-portion of said shaft and said lift-varying means so as to convert rotation of said torque member into deflections of said lift-varying means.

11. An aircraft airload reducing device according to claim 7, in which said wing-deflections sensing member consists of a spanwise extending rod; there being a spring disposed in coaxial prolongation of said rod, said spring having its outboard end anchored to the wing beyond the outboard end of the rod and having its inboard end pivotally connected to said rod; said torque member consisting of a shaft mounted in chordwise attitude in the wing, said shaft having its front end lying adjacent the outboard end of the rod; there being a vertical arm fixed to the front end of said shaft and extending into pivotal engagement with the outboard end of said rod, said arm having a pivotal connection with the inboard end of said spring; a lateral arm fixedly carried by said shaft near the shaft's rear end, and a chordwise link pivoted at its front end to said lateral arm and adjustably connected at its rear end to the lift varying means.

12. An aircraft airload reducing device according to claim 7, in which said wing-deflections sensing means consists of a single, elongate, flexible and relatively inextensible member disposed in spanwise adjacency to a spanwise extending member of the wing; rollers mounted on said spanwise extending member in adjacency to said elongate member for guiding same; the torque member consisting of a shaft extending chordwise in the wing with its forward end lying adjacent the outboard end of said elongate member, there being means operatively interposed between the outboard end of said elongate member and the forward end of said torque member for converting the substantially linear motion of said outboard end into rotary motion of said chordwise member about its longitudinal axis; and motion-transmitting and converting means operatively interposed between the rear end-portion of said torque member and said lift-varying means and operatively connected to both said member and to said lift-varying means.

References Cited in the file of this patent

UNITED STATES PATENTS

| 2,188,083 | Koppen | Jan. 23, 1940 |
| 2,207,402 | Gunter | July 9, 1940 |
| 2,286,150 | Mercier | June 9, 1942 |
| 2,406,588 | Cornelius | Aug. 27, 1946 |
| 2,523,579 | Lloyd | Sept. 26, 1950 |